US007502878B1

(12) United States Patent
Wright

(10) Patent No.: US 7,502,878 B1
(45) Date of Patent: Mar. 10, 2009

(54) METHOD AND APPARATUS FOR SWITCHING USB DEVICES BETWEEN MULTIPLE USB HOSTS

(75) Inventor: David G. Wright, Escondido, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 181 days.

(21) Appl. No.: 10/871,328

(22) Filed: Jun. 18, 2004

Related U.S. Application Data

(60) Provisional application No. 60/483,091, filed on Jun. 27, 2003.

(51) Int. Cl.
*G06F 3/00* (2006.01)
*G06F 5/00* (2006.01)
(52) U.S. Cl. ...................................................... 710/37
(58) Field of Classification Search ................. 710/313, 710/306, 305, 100, 104, 106, 62, 37
See application file for complete search history.

(56) References Cited

U.S. PATENT DOCUMENTS

| | | | | |
|---|---|---|---|---|
| 5,784,581 | A * | 7/1998 | Hannah ....................... 710/110 |
| 6,532,512 | B1 * | 3/2003 | Torii et al. ................... 710/316 |
| 6,732,218 | B2 * | 5/2004 | Overtoom et al. ........... 710/313 |
| 6,934,793 | B2 * | 8/2005 | Ying et al. ................... 710/316 |
| 7,024,504 | B2 * | 4/2006 | Saito et al. ................... 710/110 |
| 2003/0092437 | A1 * | 5/2003 | Nowlin et al. ............... 455/420 |
| 2004/0019732 | A1 * | 1/2004 | Overtoom et al. ........... 710/313 |
| 2004/0078713 | A1 * | 4/2004 | Yanagihara .................... 714/43 |
| 2004/0111544 | A1 * | 6/2004 | Bennett et al. ................ 710/62 |
| 2004/0205276 | A1 * | 10/2004 | Ferguson ..................... 710/305 |

OTHER PUBLICATIONS

USB in a Nutshell- making sense of the USB standard (Nov. 23, 2002), 3 rd release.*
American Heritage Collage dictionary, Fourth Edition, 2002 Houghton Mifflin Company, p. 1039.*
Universal Serial Bus Specification 2.0 (Rev-1) Apr. 27, 2000.*
Universal Serial Bus On-The-Go Specification 2.0 (Rev-1) Dec. 18, 2001.*
Wikipedia, the free encyclopedia, 2003, p. 1.*

* cited by examiner

*Primary Examiner*—Thomas Lee
*Assistant Examiner*—Mohammed H Rehman
(74) *Attorney, Agent, or Firm*—Stolowitz Ford Cowger LLP

(57) ABSTRACT

A hub switch allows a high-speed USB peripheral or set of peripherals to be shared between multiple USB hosts. Multiple USB ports are configured to connect to different USB peripheral devices and USB hosts. Switching logic is located between at least some of the USB ports and USB logic. The switching logic selectively connects the USB peripheral devices to different selectable ones of the USB hosts.

26 Claims, 10 Drawing Sheets

(Background)

METHOD AND APPARATUS FOR SWITCHING USB DEVICES BETWEEN MULTIPLE USB HOSTS

CROSS REFERENCE TO RELATED APPLICATIONS

The present application claims priority to U.S. Provisional Patent Application No. 60/483,091, filed on Jun. 27, 2003.

TECHNICAL FIELD

The present invention relates generally to electronic devices and in particular to universal serial bus (USB) systems.

BACKGROUND OF THE INVENTION

The USB bus standard is an easy-to-use universal interface for the Personal Computer (PC) that has gained widespread acceptance. From the user perspective, the benefits of USB include universal plug-and-play and relative ease-of-use. When a USB peripheral is plugged-in to a USB port on a PC, the system auto-detects and auto-configures the USB devices. In most cases, user intervention is not required. This is a significant improvement over prior technology where a user had to open the PC to install a component. The USB interface also eliminates the need for multiple I/O standards, thereby simplifying PC connectivity for the consumer as well as simplifying manufacturing for the PC Original Equipment Manufacturers (OEMs).

The original USB specification has evolved over time to meet the needs of the industry, resulting in two versions available today. The USB interface is described as version 1.1 "Universal Serial Bus Revision 1.1 specification" and version 2.0 "Universal Serial Bus Revision 2.0 specification", both documents are available at the USB website 'http://www.usb.org/developers/docs/'.

The first USB specification, version 1.1, focused on making computing easy for everyone, and has been very successful in achieving this goal. The first USB interface is well suited to simple PC peripherals such as mice, keyboards, joysticks, and the occasional mass storage device. However, the bandwidth of USB 1.1 is insufficient for some applications. With a top speed of 12 Million bits/second (Mbps), system performance can become sluggish if multiple multimedia devices were attached to the same USB port.

To address this problem, the USB specification was updated to version 2.0 to improve the performance and usability of PC peripherals, opening the door to a world of high-performance/high-bandwidth applications such as mass storage, digital video, and broadband access. A further advantage is that all of these applications and many others can run simultaneously. The speed of USB 2.0 has been increased to 480 Mbits/second, a 40× improvement over USB 1.1.

Both versions of the USB specification define standardized transceiver functions used for sending data across the USB interface. Both specifications also require a bus interface between the USB transceiver and other elements of the USB device, such as the host or peripheral logic. The conventional high-speed USB transceiver bus interface is described by the universal transceiver macro-cell interface (UTMI), document "USB 2.0 Transceiver Macrocell Interface (UTMI) Specification Version 1.05, Mar. 29, 2001."

A conventional embodiment of a USB 2.0 hub 12 is shown in FIG. 1. The USB hub logic 18 is coupled to a UTMI transceiver 20A on an upstream end and coupled to multiple UTMI transceivers 20B-E on a downstream end. The upstream transceiver 20A is coupled to a UBS B type upstream receptacle 24A and the downstream transceivers 20B-E are coupled to four USB A type receptacles 24B-E, respectively. A downstream port power management circuit 22 is coupled between the hub logic 18 and the A receptacles 24B-24E.

All the UTMI transceivers 20A-20E are substantially the same. The upstream transceiver 20A is a standard USB transceiver block configured to operate as an upstream (peripheral) USB port, and the four downstream transceivers 20B-20E are standard USB transceiver blocks configured to operate as downstream (hub/host) ports. The transceivers 20A-20E provide a physical layer interface between USB signaling on USB interfaces 9A and 9B and logic signaling used inside the hub logic 18. For example, the transceivers 20A-20E may provide an interface between the D− and D+USB signals on interfaces 9A and 9B and 8 or 16 bit buses 26 connected to the hub logic 18.

The conventional USB hub 12 as defined in the USB specification only allows a single host 10A to connect to multiple USB peripherals 28. It does not allow a single peripheral 28 or a group of peripherals 28 to be shared between multiple hosts 10A and 10B. To enable multiple hosts 10A and 10B to connect to one or more peripherals 28, analog switches 11 are coupled between the hosts 10A and 10B and the USB hub 12.

In recent years, arrays of servers have to a large extent replaced mainframes and minicomputers in large data processing applications. The growth of the internet has also largely been powered by the availability of relatively inexpensive servers grouped together in "farms" to store and enable access to stored web pages.

Arrays of servers typically take one of three forms. The simplest form is a number of server computers networked together each with its own monitor, keyboard, mouse, etc. More commonly, server farms are implemented either as a number of servers networked together in racks or as "blade servers" where a number of single-board computers (blades) are connected together using a backplane.

With the advent of USB 2.0 and the associated high speed data rates, server vendors and independent manufacturers of "keyboard/video/mouse (KVM) switches" have seen an opportunity to also add removable storage devices such as CD-ROMs to the mice and keyboard that they wish to share between multiple servers.

However, the current solutions developed to switch or share low speed USB devices between multiple hosts, such as the switches 11 shown in FIG. 1, do not work with high speed USB. One reason is that the analog switches 11 create discontinuities in the normally controlled USB connection 9 causing reflections in the USB signaling. These signal reflections prevent data transmissions at USB 2.0 transmission rates. The analog switches 11 also have to be manually switched and add extra expense and configuration time to the USB network.

It would be desirable to have a device that allows high-speed USB devices to be shared between multiple USB hosts.

SUMMARY OF THE INVENTION

A hub switch allows a high-speed USB peripheral or set of peripherals to be shared between multiple USB hosts. Multiple USB ports are configured to connect to different USB peripheral devices and USB hosts. Switching logic is located between at least some of the USB ports and USB logic. The switching logic selectively connects the USB peripheral devices to different selectable ones of the USB hosts.

The foregoing and other objects, features and advantages of the invention will become more readily apparent from the following detailed description of a preferred embodiment of the invention which proceeds with reference to the accompanying drawings.

DETAILED DESCRIPTION

Figure 1:
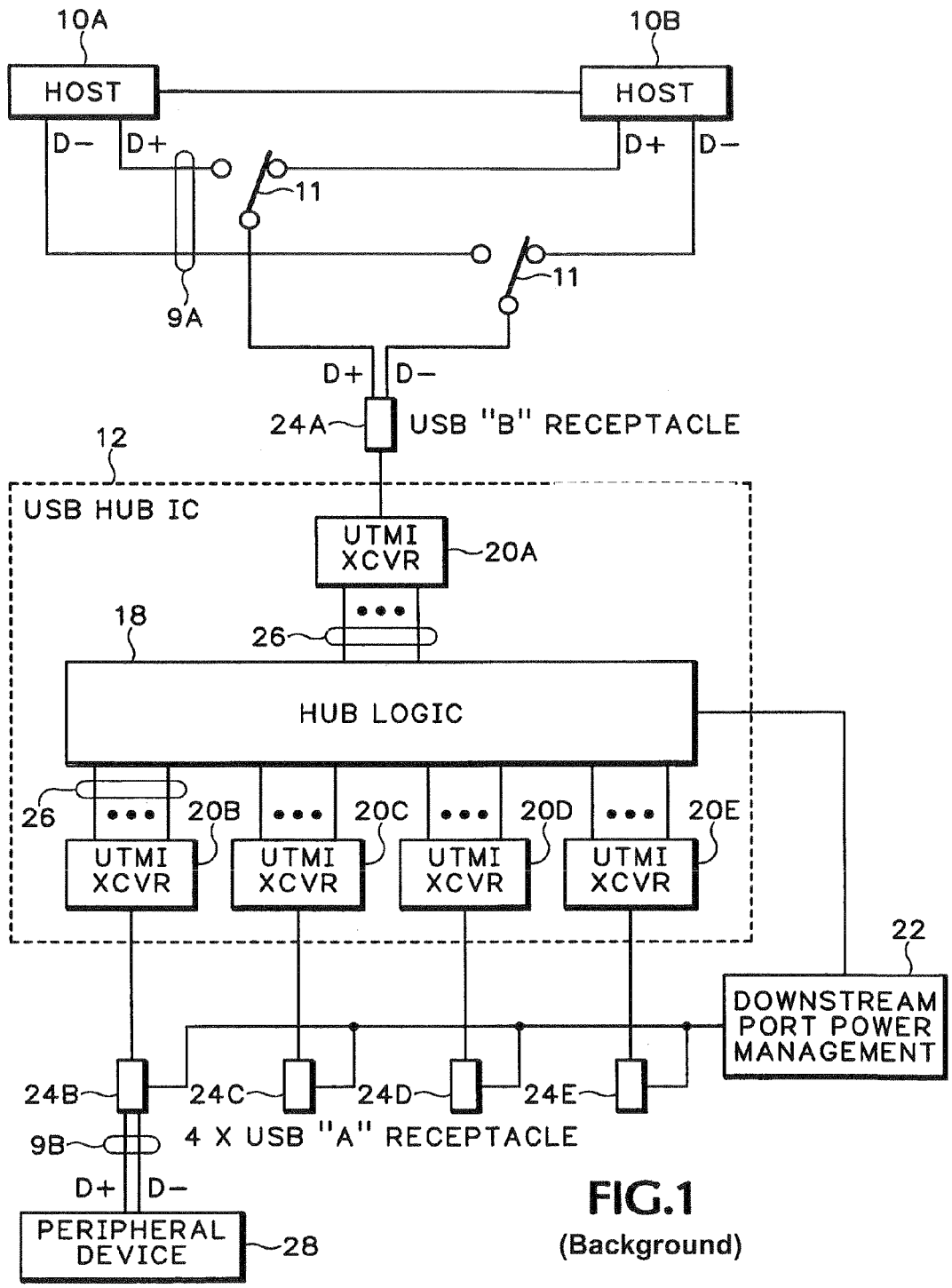
FIG. 1 shows a conventional implementation of a USB 2.0 hub.
Figure 2:
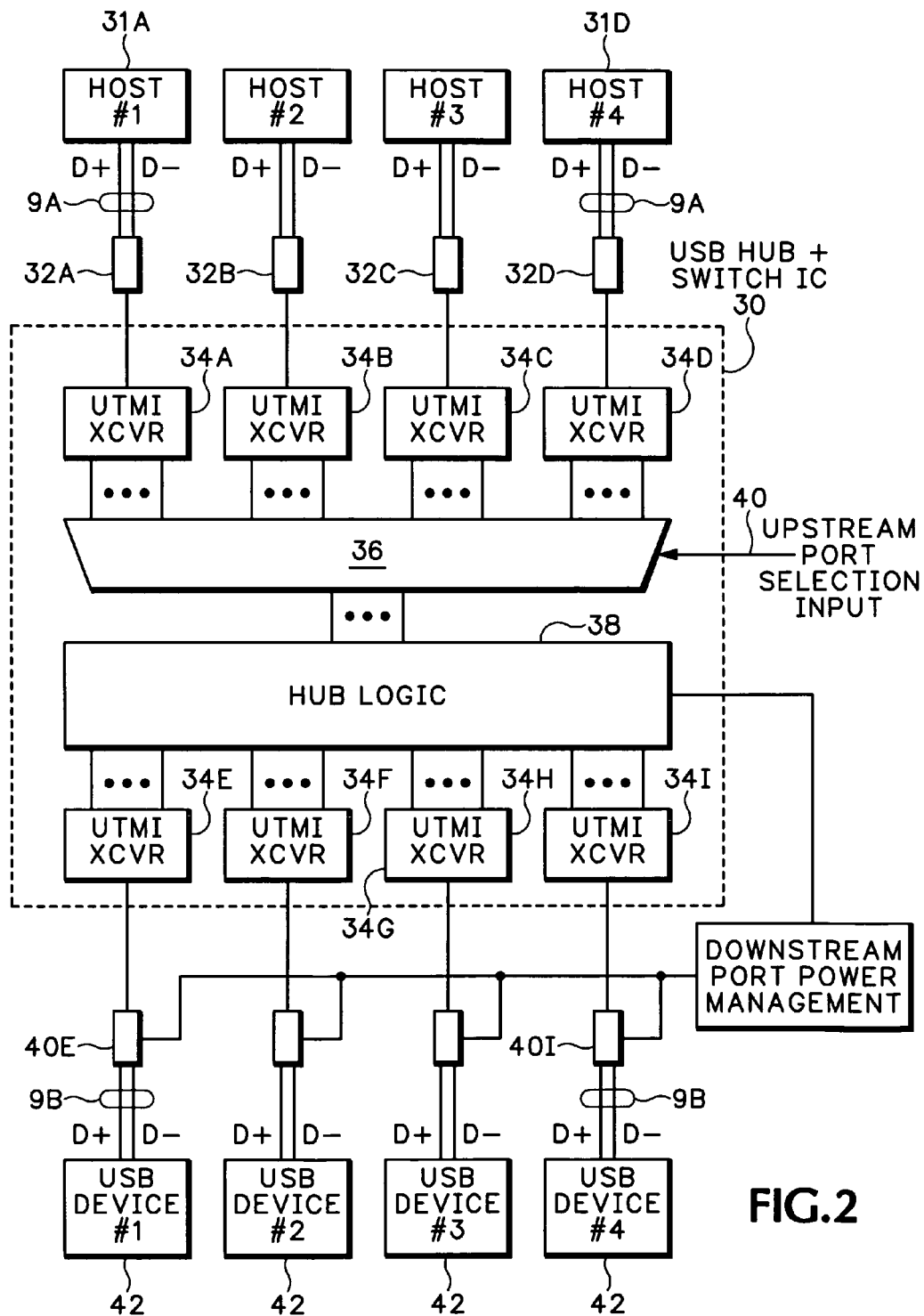
FIG. 2 shows a USB hub switch capable of switching between multiple upstream ports.

FIG. 2 shows an embodiment of a host switchable USB hub 30 (hub switch) where the internal hub logic 38 is capable of being switched between multiple different hosts 31A-31D. Hub logic 38 and downstream transceivers 34E-34I are similar to the conventional hub logic 18 and downstream transceivers 20B-20E, shown in FIG. 1. However, the hub switch 30 includes multiple upstream transceivers 34A-34D each coupled to an associated upstream USB B receptacle 32A-32D. A multiplexer 36 connects any one of the upstream receptacles 32A-32D and associated upstream transceivers 34A-34D, respectively, to hub logic 38.

The term "port" refers to the combination of the receptacle 32 and associated transceiver 34, either the receptacle 32 or transceiver 34 separately, or can also refer to the external USB upstream or downstream connection. Each of the upstream ports 32/34A-32/34D on the hub switch 30 can be connected to a different USB host 31 and each of the downstream ports 34E/40E-34I/40I can be connected to a different USB peripheral device 42. Additional USB hubs or hub switches 30 can be placed downstream of hub switch 30 allowing up to 126 USB devices 42, including high speed USB peripherals and hubs, to be switched between any one of multiple USB hosts 31.

The multiplexer 36 operates at the same USB logic layer as the USB hub logic 38 as opposed to the analog switches 11 in FIG. 1 that operate in the physical interface layer of the USB connector. This allows the multiplexer 36 to switch between different hosts 31 without effecting the physical characteristics of the USB signaling that is transferred on the USB interface 9A between the hosts 31 and the USB hub switch 30. For example, the multiplexer 36 will not cause signal reflections like the analog switches 11 in FIG. 1. As a result, the hub switch 30 allows switching between different hosts 31 while also operating at USB 2.0 transmission rates.

In one example, an upstream port selection input 40 determines which of the different upstream ports 32A/34A-32D/34D is going to be selected. The input 40 can be driven by any one of a variety of different ways that will be discussed further below in FIGS. 6 and 7. The selection input 40 can be driven either by one or more of the USB hosts 31, hub switch 30, USB devices 42 or by any other external device through any wired, wireless or network connection.

The selection input 40 generates a value that causes the multiplexer (mux) 36 to connect one of the upstream ports to the hub logic 38. The other non-selected upstream ports remain unconnected to the hub logic 38. The activated host 31A-31D then communicates with the hub switch 30 like a conventional USB hub. The mux 36 is bi-directional allowing the UTMI transceiver 34 for the selected USB host 31 to operate in a conventional manner. The selected transceiver 34 converts the upstream USB signaling received over USB connection 9A into logic data that is processed by the hub logic 38. The transceiver 34 also converts the logic data received from USB devices 42 via the hub logic 38 into USB signaling that is transported over the USB connection 9A to the selected USB host 31. In one example, the USB connections 9A and 9B are USB cables. If the selection input 40 selects another USB host 31, then the currently connected host 31 is disconnected from the hub logic 38 by mux 36 and the newly selected host 31 is connected.

The example above describes four selectable upstream ports and four downstream ports for each hub switch 30. However, there can be any number of upstream and downstream ports used for each hub switch 30, as long as the number of ports complies with the USB specification.

Figure 3A:
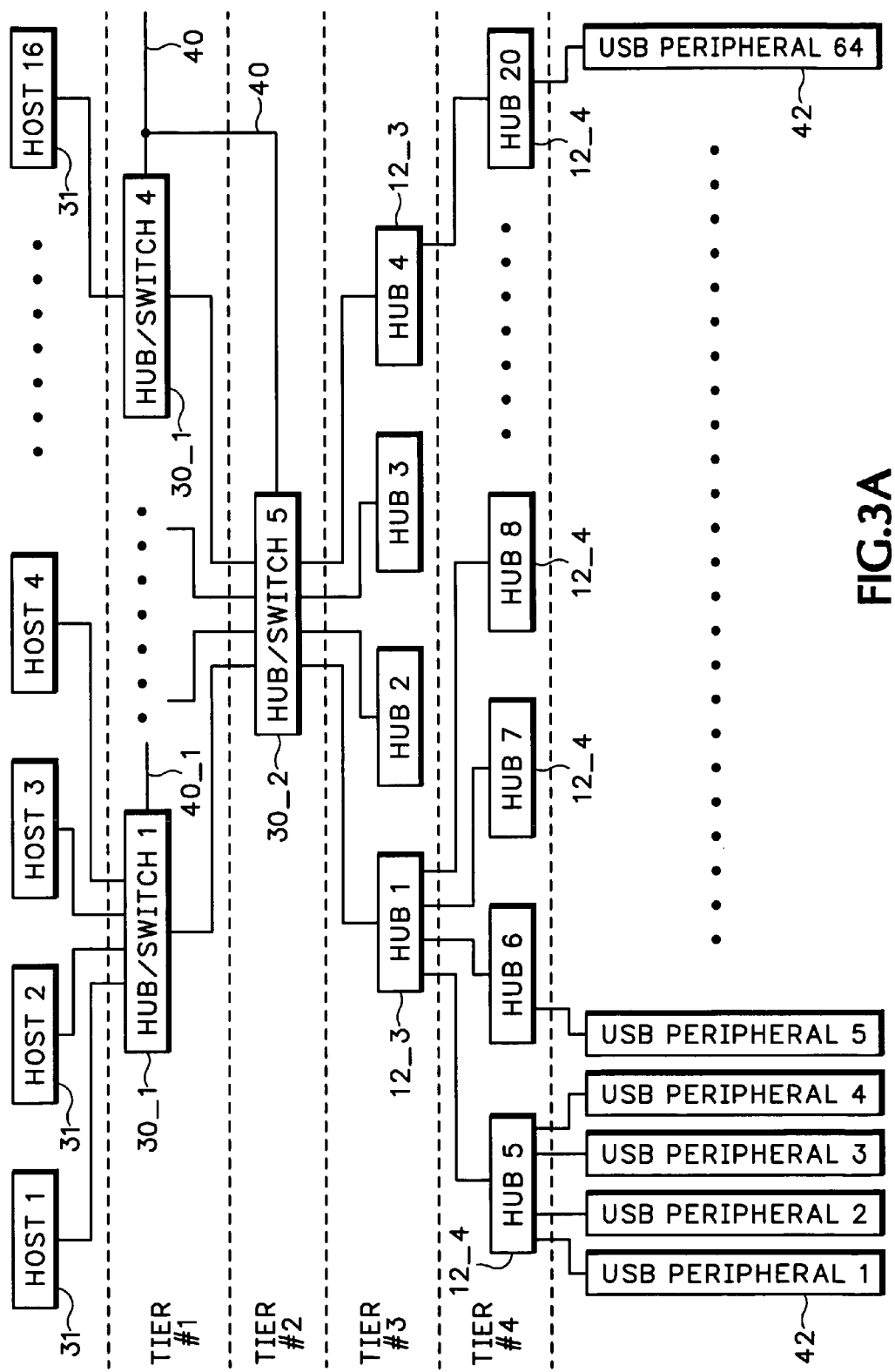
FIGS. 3A and 3B show examples of how multiple USB hub switches can be connected together in multiple tiers.

FIG. 3A shows how multiple tiers of hub switches 30_1 and 30_2 provide multilevel multiplexing that connects any one of the hosts 31 to any one of the peripheral devices 42. The example in FIG. 3A shows how 64 USB peripheral devices 42 are shared between 16 USB hosts 31. However there are many different possibly configurations for different numbers of hosts 31 and USB peripheral devices 42. The USB hosts 31 can be any processing device that is capable of providing USB host functionality. For example, the hosts 31 can be Personal Computers (PCs), servers, network processing devices such as switches, routers, gateways, etc., or any other type of computing device.

In a first tier #1, four hub switches 30_1, similar to the hub switch 30 shown in FIG. 2, are each connected to four different hosts 31. In a second tier #2, a fifth hub/switch 30_2 is coupled on upstream ports to the four hub switches 30_1 from tier #1. The downstream ports of the hub switch 30_2 in the second tier #2 are coupled to four conventional USB hubs 12_3 similar to hub 12 shown in FIG. 1. Each conventional USB hub 12_3 includes a single upstream port and four downstream ports.

The fourth tier #4 in FIG. 3A includes 16 additional conventional USB hubs 12_4 each similar to the USB hub shown in FIG. 1. Each USB hub 12_4 from tier #4 includes one upstream port coupled to one of the downstream ports for the USB hubs 12_3 from tier #3 and has four downstream ports each connected to one of the USB peripheral devices 42.

The upstream port select input 40 for the tier #1 hub switches 30_1 is driven so that only one of the hosts 31 is connected to the hub switch 30_2 in tier #2. The port select line 40 also selects one of the four upstream ports for the tier #2 hub switch 30_2 corresponding with the hub switch 30_1 in tier #1 that has the selected host 31. At this point there is only one host 31 that is physically connected to all the USB hubs 12_3 and 12_4 in tiers #3 and #4. The conventional USB hubs 12_3 and 12_4 in tiers #3 and #4, respectively, expand out the number of USB peripheral devices 42 that then communicate with the selected host 31.

Figure 3B:
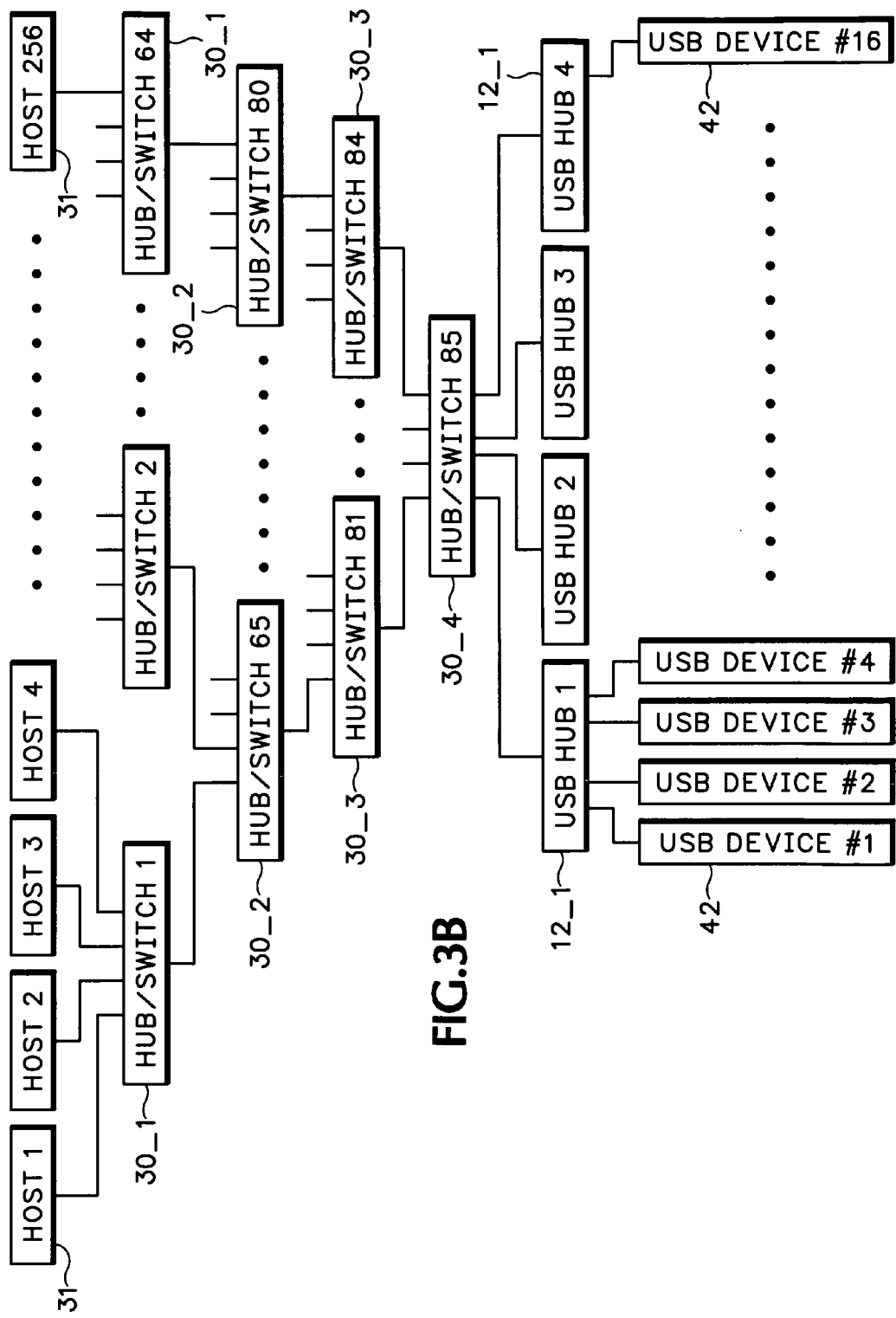

FIG. 3B shows an alternative embodiment where the tiers of hub switches 30_1-30_4 are cascaded so that sixteen USB peripherals are shared between 256 hosts. In this example, tier #1 has 64 hub switches 30_1 each connected to four hosts 31. The second tier #2 has 16 hub switches 30_2 each connected to four hub switches 30_1 from the first tier #1. The third tier #3 has 4 hub switches 30_3 each connected to four of the hub switches 30_2 from the second tier #2. A fourth tier #4 includes one hub switch 30_4 connected to the four hub switches 30_3 from the third tier #3. The downstream ports for the hub switch 30_4 are each coupled to a conventional USB hub 12_1. Each downstream port for each of the four USB conventional hubs 12_1 is coupled to a USB peripheral devices 42.

In another configuration, four peripherals devices 42 are shared between 1024 hosts. In this example, 256 hub switches 30_1 in the first tier #1 are each coupled to four different hosts 31. In the second tier #2, 64 hub switches 30_2 are each connected to four hub switches 30_1 from the first tier #1. The third tier #3 has 16 hub switches 30_3 each connected to four hub switches 30_2 from the second tier #2. The fourth tier #4 has 4 hub switches 30_4 each connected to four of the hub switches 30_3 from the third tier #3. A fifth tier #5 hub switch is connected at the upstream ports to the four hub switches 30_4 from the fourth tier #4. The four downstream ports for the hub switch in the fifth tier #5 are each coupled to a USB peripheral device 42.

Figure 4:
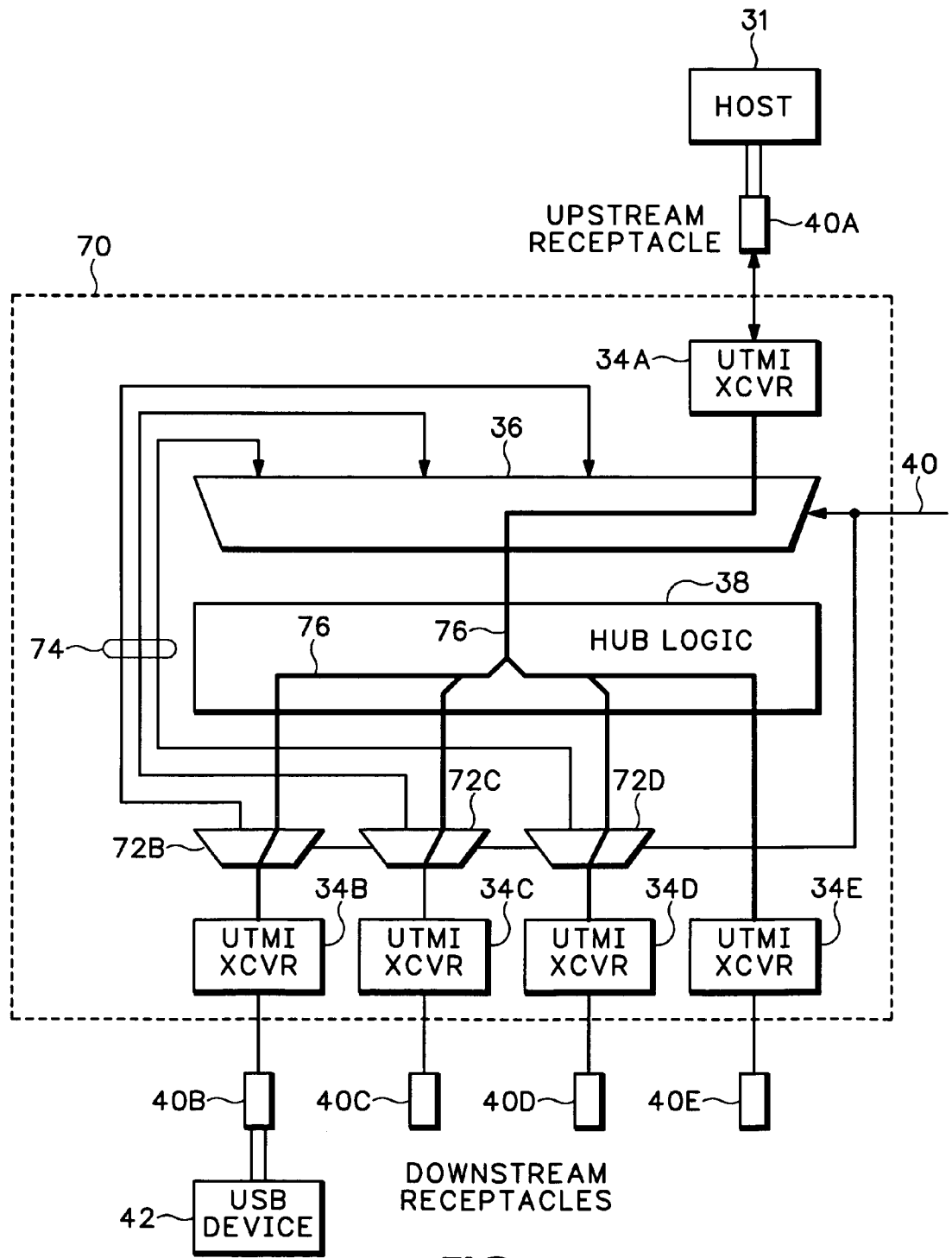
FIG. 4 shows one embodiment of the USB hub switch with reconfigurable upstream and downstream ports operating in a first hub mode.

FIG. 4 shows another embodiment of a hub switch 70 that uses the same interface circuitry as upstream and downstream ports. The hub switch 70 implements a host switching mode while also providing standard USB 2.0 hub functionality in a normal operating mode. The hub switch 70 includes conventional hub logic 38 and includes the same mux 36 shown in FIG. 2. One dedicated upstream transceiver 34A is coupled between an upstream B receptacle 40A and the mux 36. One dedicated downstream transceiver 34E is coupled between the hub logic 38 and a downstream A receptacle 40E. Additional muxes 72B-72D are coupled between the hub logic 38 and dual mode transceivers 34B-34D. Connections 74 couple muxes 72B-72D to mux 36. The muxes 36 and 72 are all bi-directional multiplexers.

The standard USB hub operating mode is shown in FIG. 4. The muxes 72B-72D connect the three transceivers 34B-34D, respectively, to the downstream port logic inside the hub logic 38 (ports 2-4). The upstream transceiver 34A is configured to connect to the upstream port logic in the hub logic 38. Thus, the receptacle 40A and transceiver 34A operate as an upstream port and the receptacles 40B-40E and associated transceivers 34B-34E, each operate as downstream ports. This is represented by dark link 76.

Figure 5:
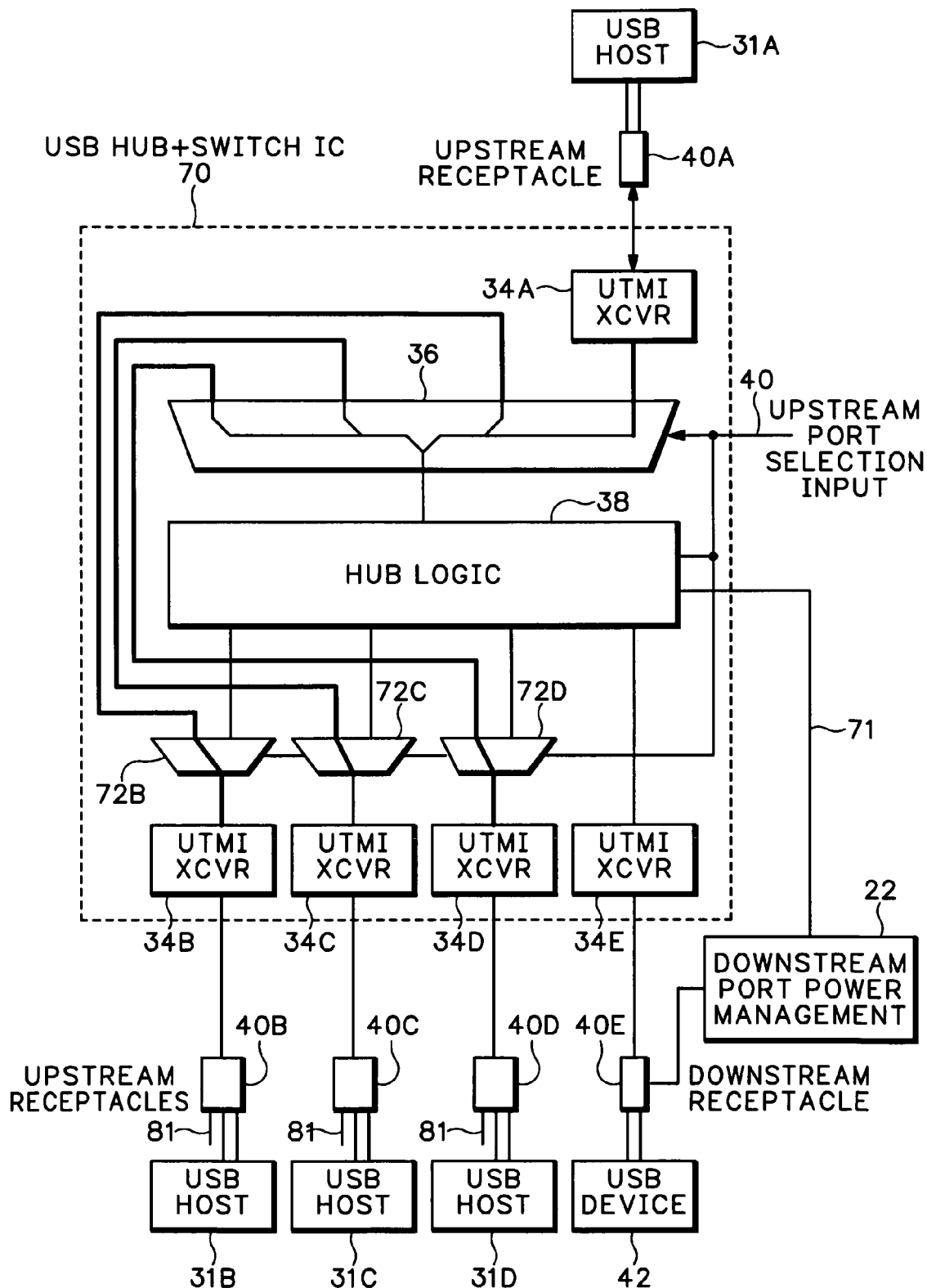
FIG. 5 shows the USB hub switch of FIG. 4 operating in a second host switch mode.

FIG. 5 shows the host switching mode for the dual mode hub switch 70. The multiplexers 36 and 72B-72D are configured so that the three transceivers 34B-D now operate as upstream ports similar to the transceivers 34A-34D in FIG. 2 instead of as downstream ports as shown in FIG. 4. In this configuration, USB hosts 31A-31D are coupled to the receptacles 40A-40D, respectively, and a USB peripheral device 42 is connected to the sole downstream receptacle 40E.

In one embodiment, mini A-B connectors are used for receptacles 40B-40D so that the same receptacle can be used as either as an upstream connector or as a downstream connector. The hub logic 38 detects the presence of either an A type upstream USB connector or a B type downstream connector plugged into the mini AB connectors 40B-40D and configures the multiplexers 36 and 72 accordingly.

For example, if an A type USB downstream connector is plugged into any one of receptacles 40B-D, the hub logic 38 or selection line 40 configures the hub switch 70 as shown in FIG. 4. If a B type upstream connector is plugged into any of receptacles 40B-40D, the hub logic 38 or the selection line 40 configures the hub switch 70 as shown in FIG. 5. In one embodiment, the hub switch 70 is preconfigured into the conventional hub mode shown in FIG. 4 and automatically switches to the host switch mode shown in FIG. 5 whenever a B type upstream connector is plugged into one of the receptacles 40B-40D.

In alternative embodiments, there are different numbers of dedicated upstream and downstream ports. For example, there may be three downstream ports, and the hub logic 38 switches between two upstream ports. In another example, there may be two downstream ports and the hub switch switches between three upstream ports. In this example, the transceivers 34D and 34E and associated receptacles 40D and 40E are dedicated downstream ports. The two transceivers 34B and 34C and associated receptacles 40B and 40C are either dedicated upstream ports or are dual mode upstream and downstream ports. Of course, other configurations are also possible.

Several techniques may be used for controlling which upstream port is selected as the active upstream port and for selecting between the normal hub mode and host switch mode. Referring to FIG. 5, a miniAB connector has a pin 81 that identifies whether a miniA-plug (which would be connected to a peripheral) or a miniB plug (which would be connected to a host) is inserted. The downstream port power management block 22 has connections 71 to the hub logic 38 used during normal operation in standard hub mode to indicate if the power management block 22 has detected an over-current condition on a downstream port.

These connections 71 could be dual-used in a context sensitive manner, so that at power-up, when an over-current condition is not possible, they are used to signal to either the hub logic 38, or to the mux circuitry 36 and 72B-72D directly, that a host is connected. Signals 71 may also be used as a binary address to indicate which of the four ports A-D is enabled as the active host port.

In normal operation, after power-up, the connections 40B-40D having a peripheral connected would act in the normal way giving indication of whether or not there was an overcurrent event on that port. If all of the three inputs pin 81 on receptacles 40B-40D are active, ports B, C, and D that normally operate as downstream ports, operate as active upstream ports. If any of the input pins 81 are inactive, as a result of being plugged into a peripheral device 42, the port is configured to operate as a downstream port. Thus, the same ports can be used as either upstream or downstream ports enabling the same package to be used as a conventional hub or a hub switch.

USB hub controllers, such as used in hub logic 38 may have a serial interface, such as SPI, I2C, etc., used for loading hub configuration parameters. In the host switching mode in FIG. 5, the upstream port selection input 40 is one of these serial interfaces. The USB hub 70 receives commands over the input 40 which define which of the dual mode ports B-D are configured as upstream ports and which of the upstream ports A-D is selected as the active upstream port.

Figure 6:
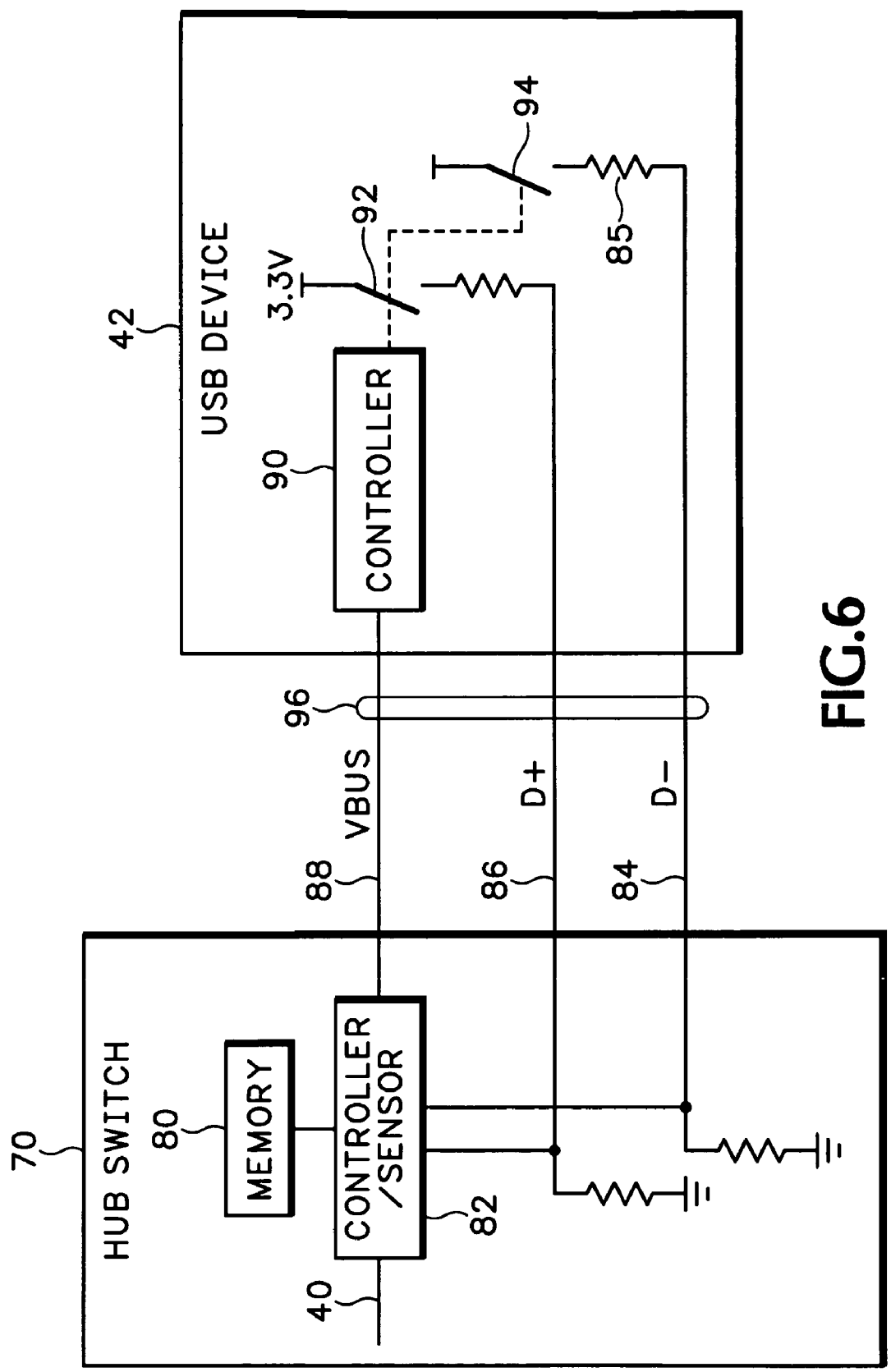
FIG. 6 is a detailed diagram of hub switch and USB peripheral transceiver interfaces.

Referring to FIGS. 5 and 6, in another embodiment, the peripheral device 42 connected to the dedicated downstream port 34E/40E can send signaling to the USB hub 70 indicating which ports B-D should be activated as upstream ports. Since USB peripherals 42 can not initiate USB transactions, these signals may not be true USB signals. However, possible embodiments include using the D+ and D− USB wires 86 and 84, respectively, in FIG. 6 to transmit non-USB messages to the USB hub switch 70. In another embodiment, configuration signaling is provided from the USB peripheral device 42 by pulsing signals over the Vbus wire 88 on the USB connection 96.

Assuming low-speed USB, a controller 90 in the peripheral device 42 for example disconnects its D− pull-up resistor 85 by opening switch 94, controller 90, then uses the Vbus line 88 and/or the D+ line 86 to transmit serial commands to the USB hub switch 70 to set the active upstream ports. A controller 82 in the hub switch 70 senses the signals on the Vbus or D+ lines and activates the associated upstream ports through the mux select input 40.

The two operating modes for the hub 70 can be set at the time of manufacture of the hub logic controller 82, for example by means of laser or electrical fuses. The operating modes could alternatively be configured by writing to an on-board non-volatile memory 80. In another embodiment, configuration bits could be set in an attached electrically erasable programmable read only memory (E2PROM) 80.

Figure 7:
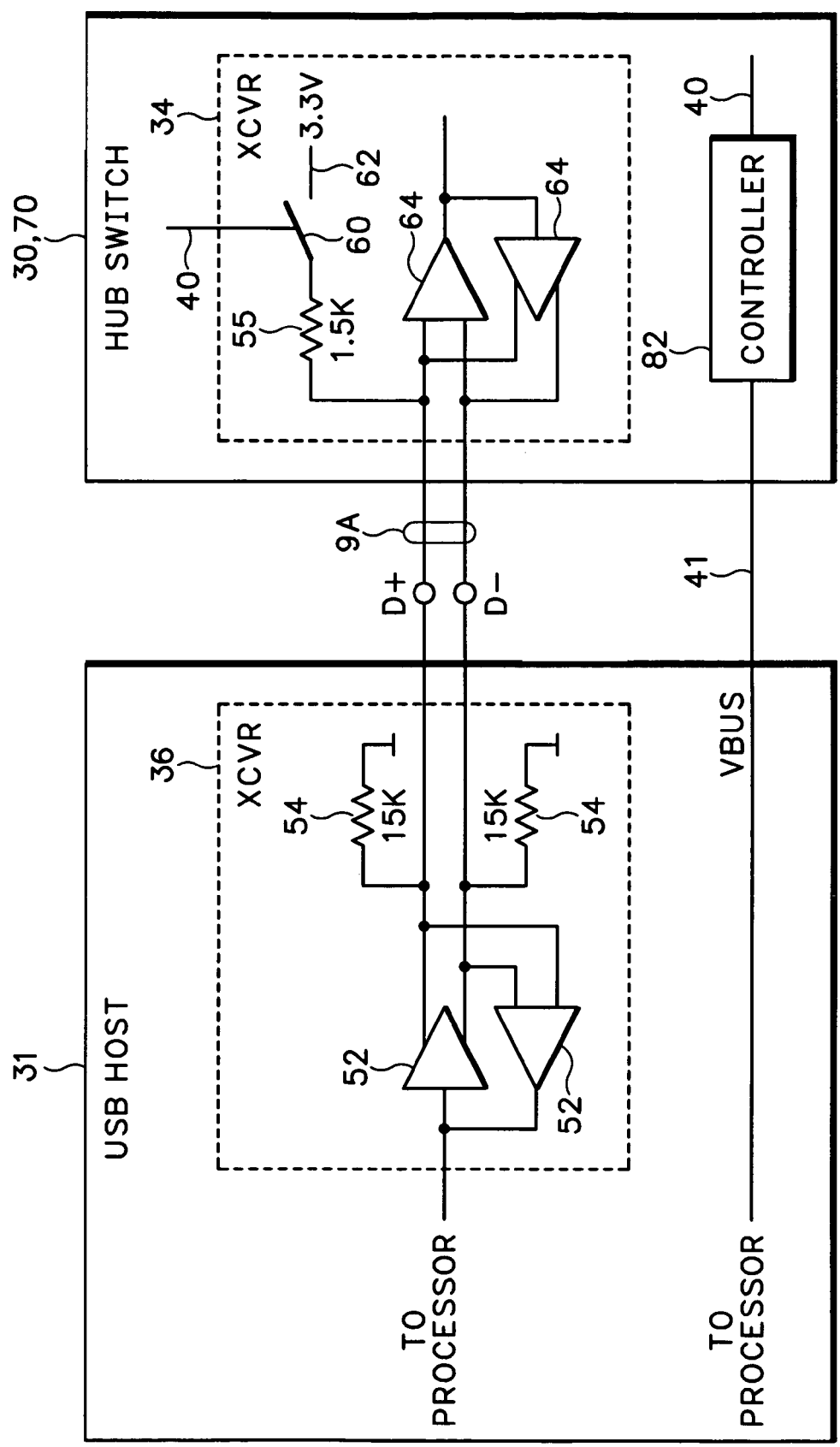
FIG. 7 is a detailed diagram of host and hub switch transceiver interfaces.

FIG. 7 shows one embodiment of the interface between a transceiver 36 in one of the hosts 31 and one of the transceivers 34 in the hub switch 30 or 70. Bi-directional buffers 52 in the USB host transceiver 32 are coupled through the USB connection 9A to bi-directional buffers 64 in the hub switch transceivers 34. Pull-down resistors 54 maintain the D+ and D− signals for the transceiver 36 in a normally low state when not connected to a USB device.

The switch 60 can be controlled by the same upstream port selection input 40, or by some other signal used for configuring the host selection muxes 72 and 36 (FIG. 5). When the switch 60 is closed, the normally low logic signal on the D+ line of the USB connection 9 is pulled up to a logic high 3.3 volts. This logic high 3.3 volt signal notifies the USB host 31 that a USB device is attached to its downstream port. If the switch 60 is open, the USB host 31 sees the D+ line as still being in the logic low state and therefore does not perceive any USB device on the downstream USB port.

The switch 60 in the transceiver 34 is closed by the controller 82 when the associated host 31 is selected as the active host. The switch 60 is opened by a controller 82 in the hub switch when the associated USB host 31 is not selected for connecting to the downstream peripheral devices 42. This allows only the selected USB host 31 to recognize the downstream USB devices 42 connected to their downstream ports. For example, USB host 31C in FIG. 5 may be selected as the active host connected through the multiplexers 72C and 36 to the downstream port 34E/40E. In this example, the switch 60 in transceiver 34C is closed and the switches 60 in the other upstream transceivers 34A, 34B, and 34D are opened so that the associated hosts 31A, 31B, and 31D do not perceive the presence of the hub switch 70.

The USB hosts connected to the upstream ports A can alternatively send USB commands to the USB hub that are used to switch to different upstream port configurations. For example, the active host could send a USB command to the hub switch 30 or 70 telling the hub switch to switch to another host. In another example, a user presses a predetermined set of keys on a USB keyboard device. The combination of pressed keys, such as a control/Alt plus some number, is sent to the USB host. The host interprets the key combination as a request to connect a different host to the peripheral devices. The hub switch then sends a corresponding USB command that causes the hub switch to selected the upstream ports associated with the identified host.

In yet another embodiment, the hosts 31 are connected to each other through some other networking technology (for example over the Internet) and conduct an arbitration among themselves to determine which is going to be connected t the hub switch. The currently connected host then sends a USB command directing the hub switch to connect to the host winning the Internet arbitration. Another embodiment may automatically switch between the different hosts on a time slot bases. Each host periodically being connected to the hub switch for a predetermined time period. If a host does not need to use the peripheral devices during its time slot, it can send a USB message directing the hub switch to immediately connect to the host associated with the next time slot.

In another embodiment, a USB host signals it is finished with the peripherals by disabling its Vbus output 41. When a host 31 wants to use the peripherals 42, it enables its Vbus output 41. When the Vbus signal 41 on the currently used upstream port goes inactive, the hub switch 70 starts sensing all Vbus inputs 41 from all hosts 31. The controller 82 then switches the mux circuitry to connect the upstream port for the next Vbus signal 41 that goes active.

Figure 8:
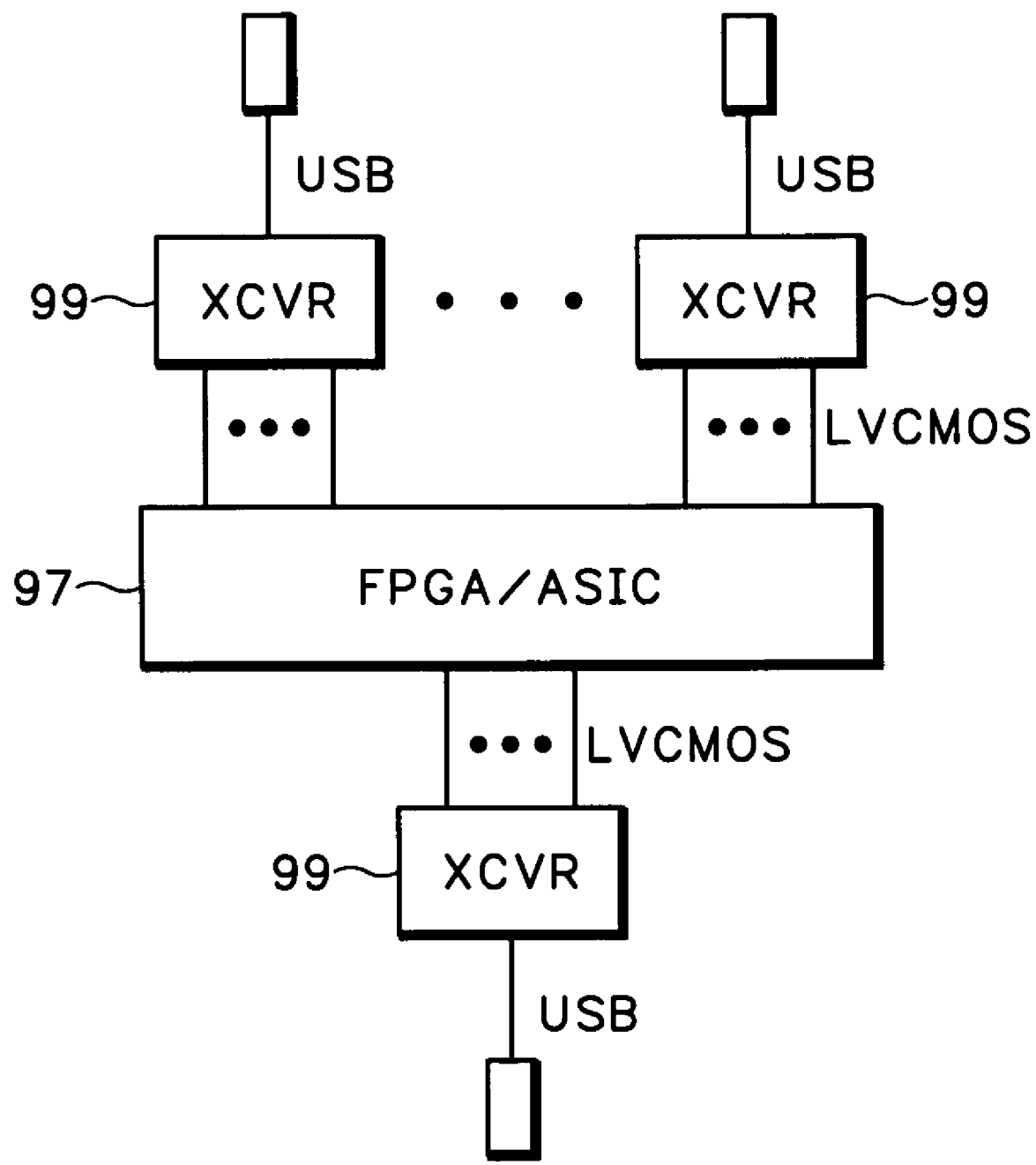
FIG. 8 shows an alternative embodiment of the USB hub switch.

In one embodiment, the USB hub logic 38 is integrated with the UTMI transceivers 34. In an alternative embodiment, a separate USB transceiver interface is used. In another embodiment shown in FIG. 8, stand-alone USB transceivers 99 are provided with a separate hub logic device 97. The hub logic 97 could be implemented for example using a field programmable gate array (FPGA), application specific integrated circuit (ASIC), another type of programmable logic device, or using a processor that implements the hub logic in software. These implementations have any number of downstream ports capable of switching between multiple USB hosts.

USB transceiver interfaces other than UTMI may be also be used. For example, transceivers implementing the UTMI Low Pin Interface (ULPI). Any other standard or non-standing interface between a USB transceiver and device logic can also be used.

In another embodiment, the hub switch could be implemented in a USB1.1 hub to enable implementation of simple keyboard/mouse switching between multiple USB hosts. Alternatively, the hub switch enables a high-speed USB peripheral or group of peripherals to be shared between multiple USB hosts. Certain USB keyboard/mouse sharing devices (KVM switches) can also switch to high-speed USB devices such as hard disk drives (HDD)s, CD-ROM drives, Digital Video Discs (DVD) drives, etc.

Figure 9:
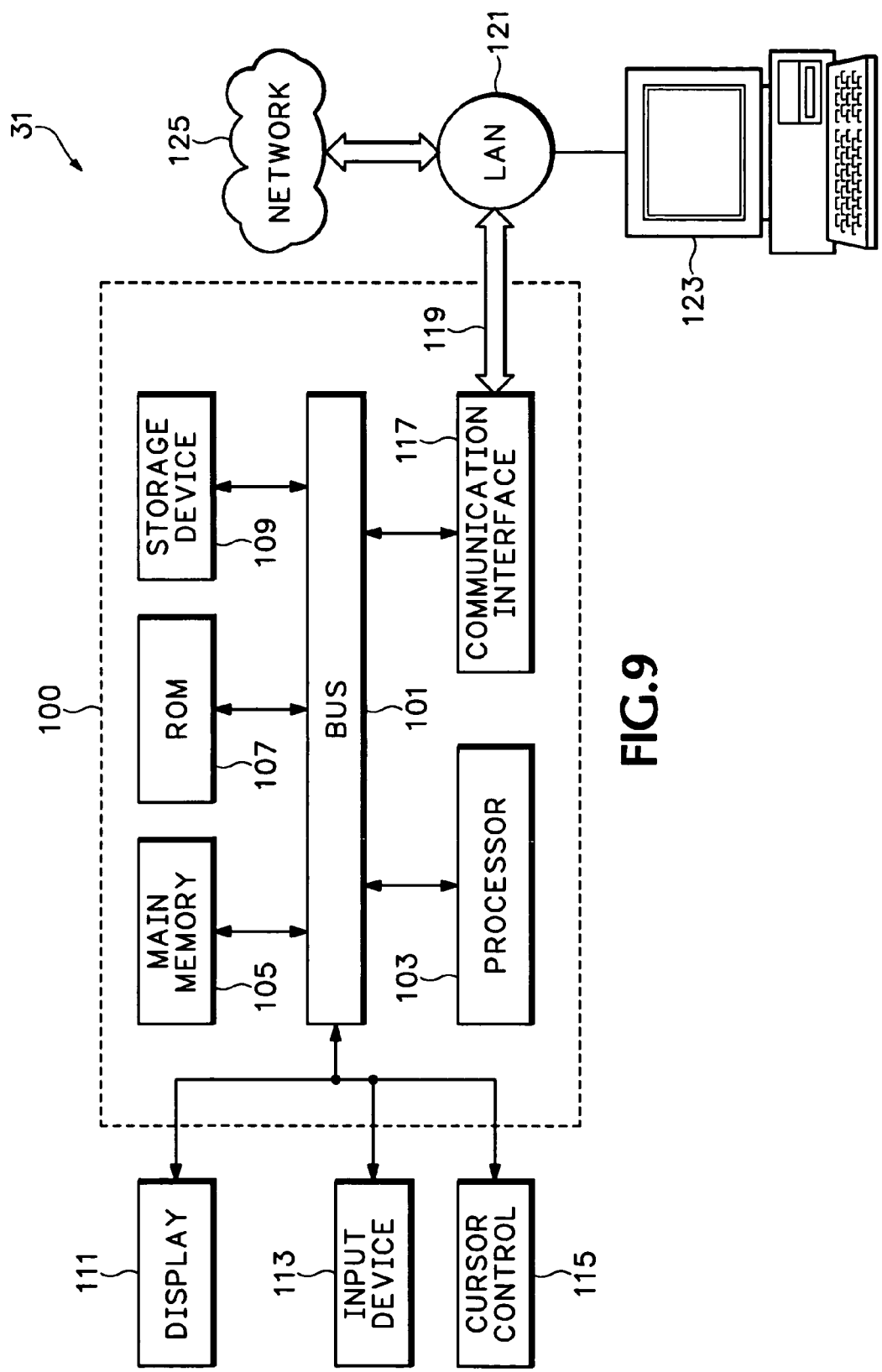
FIG. 9 shows an exemplary system with which the improved device and method may be used.

FIG. 9 shows one example of a host 31 comprising a computer system 100. The computer system 100 includes a bus 101 or other communication mechanism for communicating information and a processor 103 coupled to the bus 101 for processing information. The computer system 100 also includes main memory 105, such as a random access memory (RAM) or other dynamic storage device, coupled to the bus 101 for storing information and instructions to be executed by the processor 103. Main memory 105 can also be used for storing temporary variables or other intermediate information during execution of instructions by the processor 103. The computer system 100 may further include a read only memory (ROM) 107 or other static storage device coupled to the bus 101 for storing static information and instructions for the processor 103. A storage device 109, such as a magnetic disk or optical disk, is coupled to the bus 101 for persistently storing information and instructions.

The computer system 100 may be coupled via the bus 101 to a display 111, such as a cathode ray tube (CRT), liquid crystal display, active matrix display, or plasma display, for displaying information to a computer user. An input device 113, such as a keyboard including alphanumeric and other keys, is coupled to the bus 101 for communicating information and command selections to the processor 103. Another type of user input device is a cursor control 115, such as a mouse, a trackball, or cursor direction keys, for communicating direction information and command selections to the processor 103 and for controlling cursor movement on the display 111.

According to one embodiment, the computer system 100, and the overall system may operate in response to the processor 103 executing an arrangement of instructions contained in main memory 105. Such instructions can be read into main memory 105 from another computer-readable medium, such as the storage device 109. Execution of the arrangement of instructions contained in main memory 105 causes the processor 103 to perform the process steps described herein. One or more processors in a multi-processing arrangement may also be employed to execute the instructions contained in main memory 105. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 100 also includes a communication interface 117 coupled to bus 101. The communication interface 117 provides a two-way data communication coupling to a network link 119 connected to a local network 121. For example, the communication interface 117 may be a digital subscriber line (DSL) card or modem, an integrated services digital network (ISDN) card, a cable modem, a telephone modem, or any other communication interface to provide a data communication connection to a corresponding type of communication line. As another example, communication interface 117 may be a local area network (LAN) card (e.g. for Ethernet™ or an Asynchronous Transfer Model (ATM) network) to provide a data communication connection to a compatible LAN.

Wireless links can also be implemented. In any such implementation, communication interface 117 sends and receives electrical, electromagnetic, or optical signals that carry digital data streams representing various types of information. Further, the communication interface 117 can include peripheral interface devices, such as a Universal Serial Bus (USB) interface, a PCMCIA (Personal Computer Memory Card International Association) interface, etc.

The network link 119 typically provides data communication through one or more networks to other data devices. For example, the network link 119 may provide a connection through local network 121 to a host computer 123, which has connectivity to a network 125 (e.g. a wide area network (WAN) or the global packet data communication network now commonly referred to as the "Internet") or to data equipment operated by a service provider. The local network 121 and the network 125 both use electrical, electromagnetic, or optical signals to convey information and instructions. The signals through the various networks and the signals on the network link 119 and through the communication interface 117, which communicate digital data with the computer system 100, are exemplary forms of carrier waves bearing the information and instructions.

The computer system 100 can send messages and receive data, including program code, through the network(s), the network link 119, and the communication interface 117. In the Internet example, a server (not shown) might transmit requested code belonging to an application program for implementing an embodiment of the present invention through the network 125, the local network 121 and the communication interface 117. The processor 103 may execute the transmitted code while being received and/or store the code in the storage device 109, or other non-volatile storage for later execution. In this manner, the computer system 100 may obtain application code in the form of a carrier wave.

The term "computer-readable medium" as used herein refers to any medium that participates in providing instructions to the processor 105 for execution. Such a medium may take many forms, including but not limited to non-volatile media, volatile media, and transmission media. Non-volatile media include, for example, optical or magnetic disks, such as the storage device 109. Volatile media include dynamic memory, such as main memory 105. Transmission media include coaxial cables, copper wire and fiber optics, including the wires that comprise the bus 101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, FIG., or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A Universal Serial Bus (USB) apparatus, comprising:
    multiple USB receptacles each connected to a USB Transceiver Macrocell Interface (UTMI) transceiver, the USB receptacles configured to receive serialized analog USB signals originating from first connected devices that are coupled to the USB receptacles through analog transmission USB connections extending between the UTMI transceivers and the first connected devices, the multiple USB receptacles configured to pass the received serialized analog USB signals to the UTMI transceivers for initial signal processing;
    first switching logic configured to receive, from the UTMI transceivers, de-serialized digital USB signals output according to the initial signal processing by the UTMI transceivers and representing the serialized analog USB signals originating from the first connected devices;
    wherein the first switching logic is configured to pass only selected ones of the initially processed digital USB signals for subsequent processing by USB logic internal to the USB apparatus, the first switching logic separated from the analog transmission USB connections by being located behind the UTMI transceivers, a location of the first switching logic behind the UTMI transceivers causing the first switching logic to selectively pass the initially processed digital USB signals to the internal USB logic without creating discontinuities in the analog transmission USB connections;
    wherein the first switching logic is located behind the UTMI transceivers such that the first switching logic performs USB host switching without causing signal reflections on the analog transmission USB connections; and
    a controller operable to configure the first switching logic according to communications that are received over at least one of the USB receptacles and independently of any non-USB interfaces on the USB apparatus, the controller configured to control which ones of the initially processed digital USB signals are passed to the USB logic for subsequent processing thereby controlling which ones of second connected devices are communicatively coupled to the first connected devices through the USB apparatus;
    wherein the USB apparatus is configured to control which one of a plurality of general purpose computers is communicatively coupled to a high speed USB peripheral according to the communications that are received over at least one of the USB receptacles.

2. The USB apparatus according to claim 1 wherein the controller is further operable to:
    monitor one of the USB receptacles that corresponds to a USB peripheral to detect non-USB signaling that is initiated by the USB peripheral, the non-USB signaling comprising communications that do not conform to USB standards, the non-USB signaling transferred over the monitored USB receptacle and through a corresponding one of the UTMI transceivers; and
    analyze the non-USB signaling to identify one of the UTMI transceivers, and cause the first signaling logic to pass initially processed digital USB signals corresponding to the identified UTMI transceiver for subsequent processing by the internal USB logic.

3. The USB apparatus of claim 2 wherein:
    the USB peripheral is connected by a Vbus line, a D+ line and a D− line; and
    the non-USB signaling are serial commands generated responsive to the USB peripheral initiating disconnection of a resistor connected to the D− line.

4. The USB apparatus of claim 3 wherein the serial commands are received as pulsing signals over the Vbus line.

5. The USB apparatus according to claim 2 further comprising second switching logic located between the first switching logic and a predefined one of the USB receptacles, the second switching logic for selectively connecting the predefined USB receptacle to a host portion of the USB logic when an input pin in the predefined USB receptacle is active and otherwise to a peripheral portion of the USB logic when the input pin is inactive.

6. The USB apparatus according to claim 2 further comprising second switching logic located between the first switching logic and a predefined one of the USB receptacles, the second switching logic for selectively connecting the predefined USB receptacle to a host portion of the USB logic when an inserted plug has a first form factor and a peripheral portion of the USB logic when the inserted plug has a second form factor.

7. The USB apparatus according to claim 2 wherein the controller is further operable to:
    apply a first logic signal to a D+ line connected to the identified UTMI transceiver responsive to receiving the non-USB signaling from the USB peripheral such that a personal computer coupled to the USB apparatus observes the USB peripheral; and
    apply a second different logic signal to D+ lines connecting to unidentified ones of the UTMI transceivers.

8. The USB apparatus according to claim 2 wherein the USB peripheral is a USB keyboard device and the non-USB signaling is controlled by pressing a predetermined key combination on the USB keyboard device.

9. The USB apparatus of claim 1, wherein the first switching logic is located behind the UTMI transceivers such that the selected initially processed USB signals are to be passed to the USB logic without causing signal reflections in USB signaling transmitted on the analog transmission USB connections.

10. The USB apparatus of claim 9, wherein the first switching logic is located behind the UTMI transceivers such that the selected initially processed USB signals are to be passed to the USB logic without effecting physical characteristics of the USB signaling transferred on the analog transmission USB connections.

11. The USB apparatus of claim 10, wherein the first switching logic operates independently of any analog switches.

12. The USB apparatus of claim 11, wherein the USB apparatus switches between different hosts while operating at 480 Mb/s rates.

13. A method, comprising:
monitoring a dedicated downstream USB receptacle on a USB hub to detect a non-USB signaling exchange initiated by a USB peripheral connected to the dedicated downstream USB receptacle, the non-USB signaling received over the dedicated downstream USB receptacle;
identifying one of a plurality of disconnected USB Transceiver Macrocell Interface (UTMI) transceivers according to the non-USB signaling, the disconnected UTMI transceivers located in the USB hub but disconnected from USB Hub Logic of the USB hub;
wherein the disconnected UTMI transceiver is operable to receive and initially process serialized analog USB signals to output corresponding de-serialized digital USB signals despite being selectively disconnected from the USB Hub Logic and therefore unable to transmit the corresponding de-serialized digital signaling to the USB Hub Logic for subsequent processing while selectively disconnected; and
connecting the identified UTMI transceiver to the USB Hub Logic; and
sending a control signal to cause a D+ line connected to the identified UTMI transceiver to change to a logic high state thereby causing any general purpose computer coupled to the identified UTMI transceiver to observe the USB peripheral;
wherein sending the control signal causes the identified UTMI transceiver to connect to the USB Hub Logic thereby enabling the identified UTMI transceiver to transmit parallel digital signaling to the USB Hub Logic.

14. The method according to claim 13 further comprising applying a 3.3 volt signal to the D+ line of the identified UTMI transceiver responsive to receiving the non-USB signaling exchange initiated by the USB peripheral.

15. The method according to claim 13 further comprising decoupling a D− pull-up resistor located on the USB peripheral during the non-USB signaling exchange.

16. The method according to claim 13 further comprising:
sensing Vbus inputs connected to the UTMI transceivers to detect when one of the Vbus inputs is changed from a disabled state to an enabled state; and
performing host switching responsive to detecting one of the Vbus inputs changing from the disabled state to the enabled state.

17. A method comprising:
detecting non-USB signaling initiated by a USB peripheral connected to a first USB receptacle of a USB hub, the non-USB signaling received over the first USB receptacle;
selecting one of a plurality of USB Transceiver Macrocell Interface (UTMI) transceivers located in the USB hub according to the non-USB signaling;
connecting the selected UTMI transceiver to USB logic in the USB hub, said connection enabling transmission of digital signaling generated by the UTMI transceiver to the USB logic, said connection causing a general purpose computer coupled to a second different USB receptacle associated with the selected UTMI transceiver to observe the USB peripheral; and
at the same time the selected UTMI transceiver is connected to the USB logic, disconnecting at least one non-selected one of the UTMI transceivers, said disconnection preventing the disconnected UTMI transceiver from transmitting the digital signaling to the USB logic while being disconnected and causing a different computer connected to a third USB receptacle of the USB hub to cease communications with the USB peripheral.

18. The method according to claim 17 further comprising:
sensing Vbus inputs connected to the UTMI transceivers to detect when one of the Vbus inputs is changed from a disabled state to an enabled state; and
performing host switching responsive to detecting one of the Vbus inputs changing from the disabled state to the enabled state.

19. An apparatus, comprising:
multiple USB receptacles;
UTMI transceivers connected to the USB receptacles and configured to initially process analog signaling received over the USB receptacles;
USB logic for subsequently processing digital signaling output by the USB Transceiver Macrocell Interface (UTMI) transceivers;
first switching logic located between at least some of the UTMI transceivers and the USB logic with no switches located on analog signal paths connecting each UTMI transceiver to its respective USB receptacle, the first switching logic for selectively disconnecting one or more of the UTMI transceivers from the USB logic; and
a controller operable to control which one or ones of the UTMI transceivers is disconnected from the USB logic.

20. The apparatus of claim 19 wherein the controller is operable to control disconnection according to a communication received by one of the USB receptacles, the communication received by the apparatus independently of any non-USB interfaces located on the apparatus such that a user can control host-switching using only USB interfaces.

21. The apparatus of claim 19 wherein the controller is operable to control disconnection according to a communication received by one of the USB receptacles, the communication having a predefined format capable of indicating that an originating host computer does not need to use a USB peripheral during a time slot that is pre-assigned for that originating host computer.

22. The apparatus of claim 19 wherein the controller is further operable to:
automatically disconnect a connected one of the USB Transceiver Macrocell Interface (UTMI) transceiver when a Vbus input for that UTMI transceiver becomes inactive.

23. The apparatus of claim 19 wherein the controller is operable to control disconnection according to a communication received by one of the USB receptacles, the communication having a predefined format capable of indicating the winner of an Internet arbitration scheme amongst a plurality of attached host computers.

24. An apparatus, comprising:
multiple USB receptacles configured to connect to different computers and at least one USB peripheral;
USB transceivers for de-serializing analog signaling received over the USB receptacles;
USB logic for processing de-serialized digital USB signals output from the USB transceivers;
first switching logic located between at least some of the USB transceivers and the USB logic for selectively connecting one of the different computers to the USB peripheral; and
a controller operable to control which one of the different computers is connected to the USB peripheral through the apparatus according to a communication transferred over one or more of the USB receptacles;
wherein the communication originates from one of the different computers when a key combination is pressed on a keyboard directly attached to that originating computer.

25. An apparatus, comprising:
multiple reversible USB receptacle and USB Transceiver Macrocell Interface (UTMI) transceiver combinations, each multiple reversible USB receptacle and UTMI transceiver combination associated with a same receptacle form factor and configured to operate with a USB peripheral when the USB peripheral is connected thereto and configured to operate with a host computer that is not the USB peripheral when the host computer is connected thereto;
USB logic for processing USB signaling received over the reversible USB receptacle and UTMI transceiver combinations;
multiplexing circuitry located between at least some of the reversible USB receptacle and UTMI transceiver combinations and the USB logic, the multiplexing circuitry for selectively connecting and disconnecting different selectable host devices to and from one or more attached USB peripherals, said location of the multiplexing circuitry between the USB logic and ones of the reversible USB receptacle and UTMI transceiver combinations preventing signal reflection;
wherein the multiplexing circuitry is further operable to:
operate a respective one of the reversible USB receptacle and UTMI transceiver combinations as a downstream port responsive to receiving an indication that a USB plug including a first USB form factor has been inserted; and
operate the respective one of the reversible USB receptacle and UTMI transceiver combinations as an upstream port responsive to receiving an indication that the USB plug includes a second form factor.

26. The apparatus of claim 25, wherein the multiplexing circuitry further comprises:
one or more first digital switches located between the USB logic and the reversible USB receptacle and UTMI transceiver combinations, the first digital switches to control whether the reversible USB receptacle and UTMI transceiver combinations are selectively disconnected from the internal hub logic according to a host selection signal; and
one or more second digital switches located between the first digital switches and the reversible USB receptacle and UTMI transceiver combinations, the second digital switches to individually control whether the reversible USB receptacle and UTMI transceiver combinations to control a peripheral portion of internal hub logic or a host portion of the internal hub logic.

* * * * *